Figure 3:
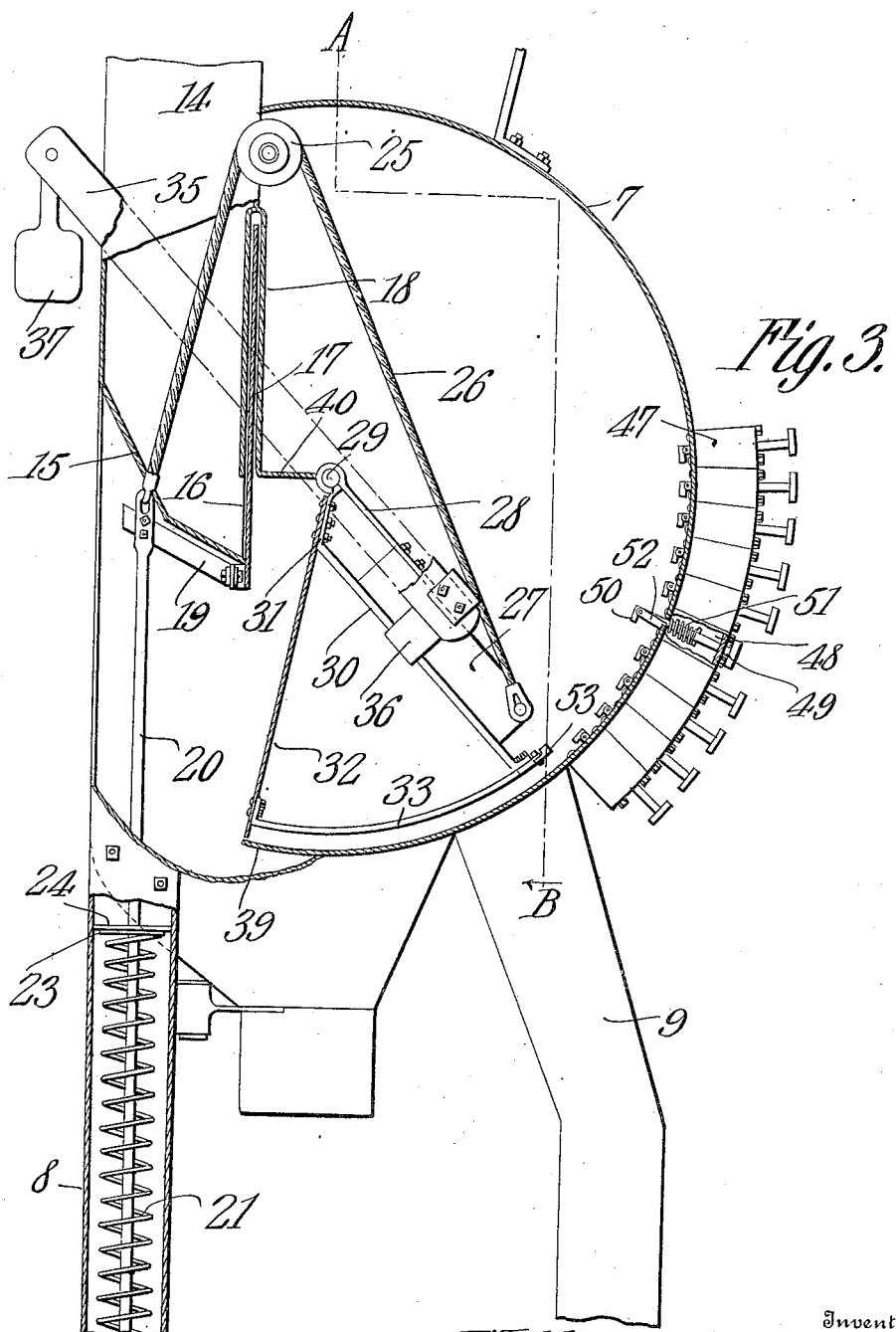

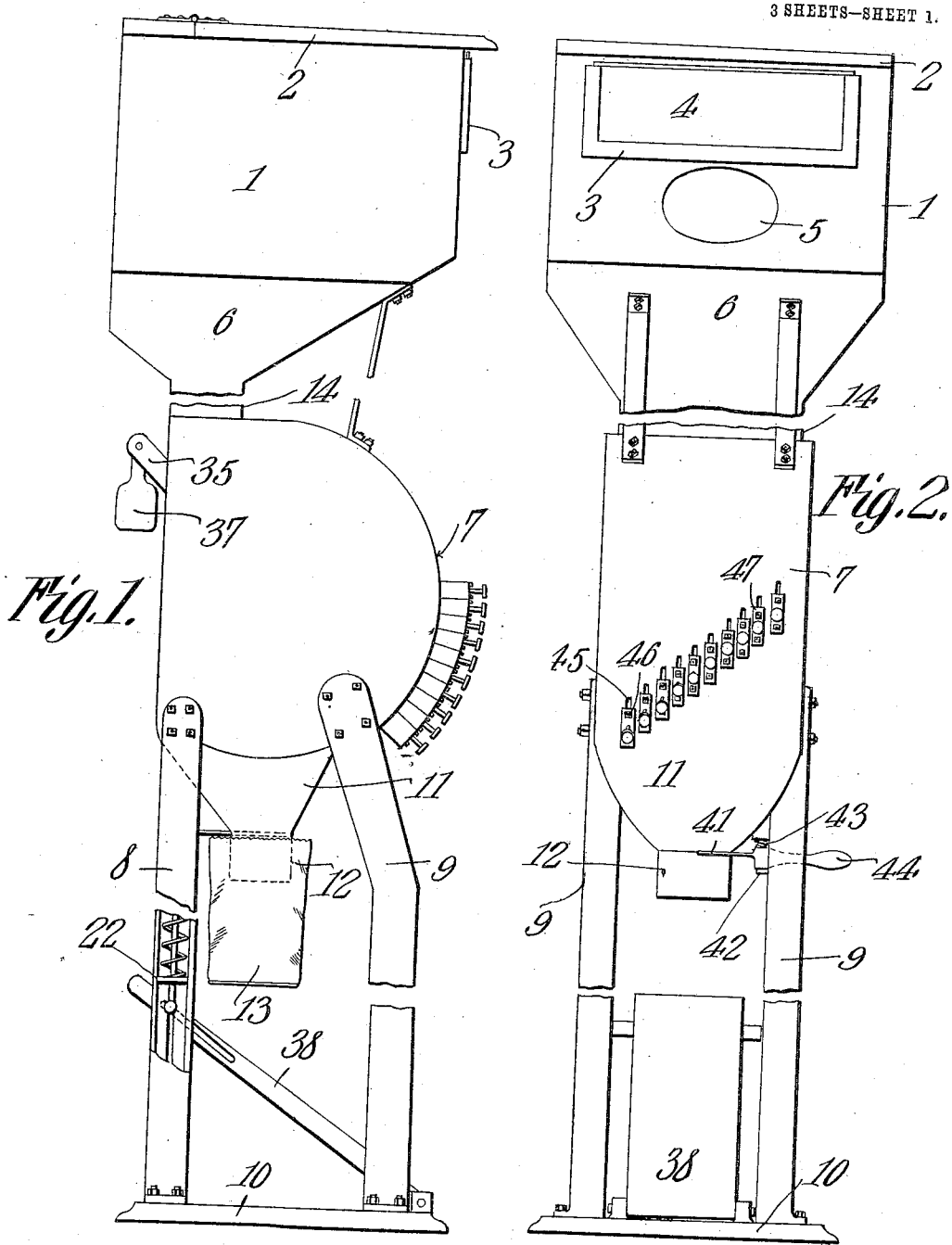

W. W. READ.
MACHINE FOR DELIVERING MEASURED QUANTITIES OF COMMODITIES.
APPLICATION FILED SEPT. 9, 1908.

917,359.

Patented Apr. 6, 1909.
3 SHEETS—SHEET 2.

Witnesses

Inventor
William W. Read.
By C. A. Snow & Co.
Attorneys

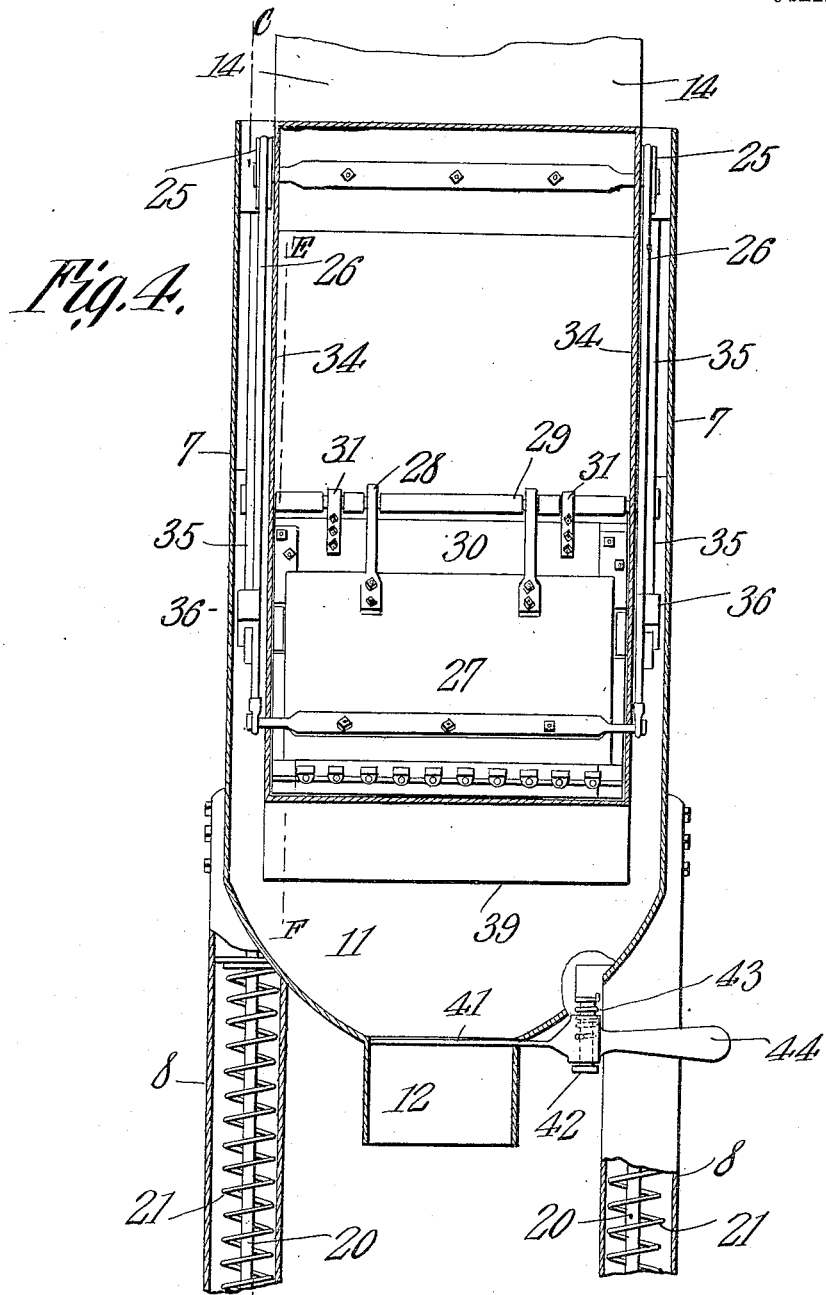

UNITED STATES PATENT OFFICE.

WILLIAM WALLACE READ, OF PATTERSON, LOUISIANA, ASSIGNOR OF ONE-THIRD TO WALTER C. MALOZ AND ONE-THIRD TO DAVID H. MALOZ, BOTH OF PATTERSON, LOUISIANA.

MACHINE FOR DELIVERING MEASURED QUANTITIES OF COMMODITIES.

No. 917,359.      Specification of Letters Patent.      Patented April 6, 1909.

Application filed September 9, 1908. Serial No. 452,185.

*To all whom it may concern:*

Be it known that I, WILLIAM WALLACE READ, a citizen of the United States, residing at Patterson, in the parish of St. Mary and State of Louisiana, have invented a new and useful Machine for Delivering Measured Quantities of Commodities, of which the following is a specification.

This invention has reference to improvements in machines for delivering measured quantities of commodities, and its object is to provide a machine which will deliver from a reservoir of the commodity definite quantities thereof, as desired by the operator.

It is often desirable to deliver certain commodities in quantities for which certain values are asked, instead of delivering the commodities by some definite weight or measure.

By the machine of the present invention it is possible to deliver quantities of the commodity desired, which quantities shall be in accordance with certain predetermined values. For this purpose there is provided means under the control of the operator for permitting the volume of the portion of the commodity to be delivered to be varied in accordance with the value received.

If it be assumed that the commodity be sold in quantities called for by the money value, as, for instance, five cents worth, or ten cents worth, or twenty cents worth, etc., then it is within the power of the operator to set the machine to deliver a quantity of goods, the value of which shall be five cents, or ten cents, or twenty cents, as the case may be.

Again, provision is made in the machine for varying the quantity delivered for the set value. Should, for instance, the market value of some certain commodity be such that a certain quantity can be sold for five cents, and a certain other quantity for ten cents, and still another quantity for twenty cents, and then the market value of the goods should advance or be lowered, so that it became necessary to sell a less amount of the goods for the fixed value, or a greater quantity of the goods could be sold for the fixed value, then it is possible to so adjust the machine that the quantity delivered for the particular value may be greater or less, in accordance with the market value of the goods.

The invention will be best understood from a consideration of the following detailed description, taken in connection with the accompanying drawings, forming a part of this specification, in which drawings:—

Figure 1 is a side elevation of the machine; Fig. 2 is a front elevation thereof; Fig. 3 is a side elevation, partly in section on the lines C—D and E—F, of the delivery and measuring mechanism of the machine, on a larger scale than shown in Figs. 1 and 2; Fig. 4 is a section on the line "A—B" of Fig. 3.

In Figs. 1 and 2 the machine is shown in substantially the proportions it has in actual practice, except that certain immaterial portions of the machine are broken away to shorten the views, it being understood that the operating parts of the machine will be of such height as to be within easy reach of the operator.

Referring to Figs. 1 and 2, there is shown a hopper 1, for containing a quantity of the commodity to be delivered, and, for convenience of access, this hopper is provided with a hinged cover 2, so that, on raising the cover, a supply of goods may be introduced into the hopper.

For advertising or other purposes the front of the hopper may contain a card-holder 3, for the reception of a card 4, upon which may be displayed the name of the goods contained within the hopper; or this card may contain any other desired information, such as the price or quality of the goods. Also the front of the hopper may have an opening, covered by glass or other transparent medium, so that the goods within the hopper may be visible. This opening is indicated at 5, where it is shown as oval, but it will be understood that this opening may be of any desired shape.

The hopper 1 terminates at the lower end in a funnel 6, which may lead into a casing 7, containing the measuring mechanism which has been shown in Figs. 3 and 4, to which reference will presently be made.

The casing 7 is supported upon suitable legs 8, 9, which may rise from a floor-plate 10, or may be directly secured to the floor, as may be desired. The casing 7 leads into another funnel 11, provided with a spout 12, for the purpose of directing the goods to be delivered, after being measured, into a bag 13, or other suitable receptacle, the bag being held by hand or in any other manner desired.

The funnel 6 terminates at the lower end into a conduit 14, leading down into the casing 7 about half way through the same near the rear end thereof. The lower end of the conduit 14 is closed by an inclined bottom wall 15, the inclination of this wall being toward the front of the conduit, which front of the conduit at its lower end is pierced by an opening 16, normally closed by a vertical gate or slide 17, the upper end of which, when in the raised position, is housed within a double walled section 18 of the casing, the upper end of this housing being closed and the lower end open for the reception of the said gate. The said gate 17 at the lower end is supported by two rearwardly projecting arms 19, fast at their rear ends to rods 20, rising through the rear legs 8 of the said machine, these legs being made hollow for the purpose. Within each leg 8 the corresponding rod 20 is surrounded by a helical spring 21 confined between a fixed ledge 22 in the legs near the lower ends thereof, and a washer 23 fixed to the rods 20, at an appropriate distance from the ledge 22. The tendency of the spring 21 is to elevate the corresponding rod 20 and so lift the gate 17 to its highest position. The upward movement of the rods 20 may be limited by another ledge 24, fixed in each leg 8 at an appropriate point therein, so that the washer 23 will abut against the ledge 24, and thereby limit the upward movement of the rods 20.

Within the casing, above the housing 18 and on each side of the conduit 14, is an idler pulley 25, over which passes a rope or flexible strand 26 connected at one end to an eye formed at the upper end of the corresponding rod 20, and at the other end to one end of a weight 27. This weight is supported by straps 28 pivotally hung from a horizontal rod 29 extending across and supported in the side walls of the casing 7 and also supported by the inner walls 34, the front portion of the said casing 7 being curved on an arc struck from the longitudinal axis of the rod 29 as a center.

The weight 27 normally rests against a plate 30 extending across the casing 7, and also hung by straps 31 from the rod 29 as a pivotal support.

Also carried by the straps 31 is another plate 32, extending radially from the axis of the rod 29, but in divergent relation to the plate 30. The free or peripheral ends of the plates 30 and 32 are joined by curved straps 33, serving to maintain the outer ends of these plates at the desired distance apart. The outer end of the plate 30 terminates a short distance from the inner face of the curved front of the casing 7, while the outer end of the plate 32 approaches closely the inner face of the curved portion of the casing 7, the approach of the end of the plate 32 to the inner face of the casing 7 being close enough to prevent the passage of any particles between the end of the said plate and the face of the casing 7. The plates 30 and 32 together form one operative structure, constituting what may be termed a segmental measuring blade, to which reference will hereinafter be made.

Mounted upon each end of the rod 29, beyond the inner end walls 34 of the casing, which end walls join the sides of the conduit 14, are two levers 35, normally inclined, as shown best in Fig. 3, and the lower ends of these levers are connected by brackets 36 to the plate 30, so that these levers will participate in all movements of the segmental blade. The upper ends of the levers 35 extend back of the conduit 14 and there carry counterbalance weights 37. The weight 27, before referred to, normally rests upon the plate 30, and serves to maintain the segmental blade in a substantially pendent position. When however the weight 27 is lifted off the plate 30, then the counterbalance weights 37 are sufficiently heavy to overbalance the segmental blade and cause it to move about the rod 29 as a pivot, away from the pendent position and upward.

The lower ends of the rods 20 are connected to opposite sides of a pedal 38, pivotally supported on the floor plate 10, and maintained normally in an upper position by the springs 21. However, when the operator presses upon the pedal 38, the resistance of the springs 21 is overcome and the rods 20 are lowered, carrying with them the gate 17, and lifting the weight 27, through the intermediary of the ropes 26. A full-down movement of the pedal or treadle 38 is sufficient to carry the gate 17 from the position shown in Fig. 3, until its lower end is coincident with the inner end of a rearwardly extending, curved portion or wall, 39 constituting a continuation of the front of the casing 7. When the gate 17 is in its lowermost position then it closes the chamber formed by the side walls 34 of the casing 7 and the front curved wall of the same at its bottom continuation 39. At the same time the opening 16 is unclosed by the upper end of the gate 17, which lowers until it is even with the bottom plate 15. At the same time the raising of the weight 27 has relieved the segmental blade, and the latter, under the influence of the counterbalance weights 37 has moved upward a limited distance, the distance being determined by means to be described.

Immediately some of the contents of the hopper 1, a portion of which contents already fill the conduit 14, pass through the opening 16 into the space in front of the gate 17, which space is defined in one direction by the plate 32. As soon as the compartment thus formed is filled, the downward movement of the contents of the hopper 1 is arrested, since these contents will not flow beyond the upper limit of the opening 16, and this may be further defined by a lateral continuation of the housing 18, as indicated at 40.

When pressure upon the treadle 38 is released the springs 21 expand and raise the rods 20, thus lifting the gate 17 and closing the opening 16, the upper end of the gate entering the housing 18. The gate will, of course, be suitably guided at the edges, and the housing is made large enough to receive any grains which may be on the top of the gate and be carried into the housing, thus preventing the crushing of any particles or grains and thereby retarding the operation of the machine. As soon as the gate 17 is raised a portion of the contents of the chamber into which the commodity in the conduit 14 has emptied will immediately gravitate over the edge of the continuation 39 into the hopper 11, but is prevented from escaping therefrom by a laterally disposed valve 41 entering the upper end of the neck 12, and traversing the upper end of the same, this valve being mounted upon a vertical pivot 42, supported by the hopper 11 or otherwise, and constrained to maintain the hopper closed by a spring 43.

The valve 41 is manipulated through the intermediary of a suitable handle 44, which may be grasped by the operator and the valve moved to unclose the bottom of the hopper 11 against the action of the spring 43, and when the handle is released this spring will return the valve to its initial position of closing the bottom of the hoper 11.

As the rods 20 return to their normal upward position, the ropes 26 are allowed to move over the pulleys 25 in a direction which permits the weight 27 to gravitate to the plate 30 and to carry the segmental blade against the action of the counterbalance weights 37 toward its initial pendent position. This movement will force any of the contents of the adjustable chamber controlled by the segmental blades, which have not already gravitated over the rear edge of the continuation 39, along and from the same until the chamber has been completely emptied of the commodity deposited therein by the downward movement of the gate 17 and the opening of the passage 16.

In the front wall of the casing 7 is an inclined series of parallel slots 45, through which extend bolts 46, each of which serves to hold a small casing 47 to the front of the main casing 7.

Each casing 47 carries a push-rod 48, having a push-head 49 at its outer end, and at the inner end formed with a laterally projecting toe or stud 50. Within the casing each rod 48 is surrounded by a helical spring 51 tending to force the push-button end thereof outward. The rod 48 carries at its inner end a pivoted latch 52, which, when the rod is fully pushed in, drops slightly downward, so as to be no longer coincident with the hole in the wall of the casing 7, through which it was projected. The pivoted latch 52 therefore serves to lock each rod 48 when it has been pushed in as far as it will go.

When a rod or push-key 48 has been pushed in to its greatest extent and there locked, it is in the path of a laterally extending bar 53, carried by the outer end of the plate 30, so that when the segmental blade is swung from its pendent position toward its uppermost position, the bar 53 will ultimately engage the latch end of a push-button 48, and will be arrested thereby in a corresponding position. As soon as the bar 53 meets the push-button or push-key 48, the latch member 52 is moved about its pivot until again coincident with the opening through which it was projected, and the action of the spring 51 will immediately draw the toe end of the push-key inward toward the small casing 47. This inward movement continues until the toe 50 is in engagement with the bar 53 and further movement is thereby arrested, but the latch is in a position to permit the outward movement of the push-key as soon as the bar 53 is moved away therefrom. Therefore, when the segmental blade again moves toward the pendent position the push-key is released, and the spring 51 immediately returns into its initial position.

Let it be assumed, by way of example, that the machine is provided with a series of ten push-buttons 48, and that the lowermost of the push-buttons or keys is so positioned that it will permit a movement of the segmental blade to form a compartment for the reception of the commodity to be delivered, which will hold an amount to be sold for five cents; and let it be supposed that the next push-button or key is so positioned that the size of the chamber permitted thereby will receive a quantity of the commodity to be delivered equivalent to ten cents worth, and so on through the whole series, by jumps of five cents each.

Let it further be supposed that a customer desires twenty-five cents worth of the commodity. Then the fifth push-key is pushed in as indicated in Fig. 3. Now, the treadle 38 is depressed and the weight 27 is lifted free from the segmental blade, and the latter immediately moves upward until arrested by the fifth push-key which is at once unlocked and in position to again be moved by its spring 51 to the outer or normal position. The treadle is held down until time enough has elapsed for the filling of the chamber formed between the gate 17 and the plate 32, and then the treadle is released, thus allowing the contents of the said chamber to gravitate into the hopper 11. At the same time, the segmental blade is again forced into its normal position by the return of the weight 27, and all the contents of the temporary receiving chamber are forced therefrom into the hopper 11. Under these conditions there is contained within the hopper 11 a quantity of the commodity equivalent to twenty-five cents worth. Now, a paper bag 13, or any other suitable receptacle, is placed in position about the delivery end 12 and the valve 41 is manipulated so as to unclose the bottom of the hopper 11, when the contents thereof will gravitate into the bag or other receptacle. In this manner any desired amount of the commodity may be caused to be discharged from the machine into a suitable receptacle by simply pushing in the proper push-key 48, and then depressing the treadle 38 and holding it for an appropriate time and then releasing the same, when the desired quantity of the commodity will be deposited in the hopper 11, ready to be delivered at the will of the operator, and at the same time the key which has been depressed has been again automatically returned to its initial position.

Suppose it is desired to adjust the machine for a commodity the market value of which is different from that of the commodity first considered, or suppose that the market value of the commodity first considered should be higher or lower than when the machine was first adjusted. Under these circumstances, the small casings 47 may be moved with relation to each other and with relation to the segmental blade by loosening the bolts 46 and sliding the casings 47 along the slots 45, the said casings being individually adjustable, so that their distances may vary one from the other or all may be adjusted a like distance. By this means various commodities may be sold from the one machine at different times, or the machine may be adjusted for variation in prices, or the machine may be adjusted so that for a predetermined larger price a greater quantity of the commodity may be delivered than would be delivered for the same amount of money in smaller sums, as for example, the machine may be set so that for twenty-five cents more than five times the quantity will be delivered that would be delivered for five cents.

What is claimed is:—

1. In a machine of the character described, a receptacle having a movable wall, means under the control of an operator for causing movement of the said wall, and means also under the control of an operator for arresting the movement of the said wall caused by the first named means, at a predetermined point, and means for returning said wall to the initial position and thereby causing the discharge of the material introduced into said receptacle.

2. In a machine of the character described, a receptacle having a movable wall, means normally tending to move the wall in one direction, means under the control of an operator for holding the wall against its normal tendency and for releasing it to move in the direction of its normal tendency, and means also under the control of the operator for arresting the movement of the said wall at a predetermined point, the second-named means also causing the return of the wall to initial position.

3. In a machine of the character described, a receptacle having a movable wall, means for moving the wall in one direction, means under the control of an operator for causing the movement of the said wall in the other direction, means having a normal tendency toward normal position and movable by the operator away from normal position to a position to arrest the movement of said wall caused by the first named means, at a predetermined point, and means under the control of said wall for releasing the last named means for its return to initial position under its normal tendency.

4. In a machine of the character described, a receptacle having a movable wall, means normally tending to move the wall in one direction, means under the control of an operator for causing the movement of said wall in the other direction, means having a normal tendency toward initial position and movable by the operator into position for arresting the movement of said wall caused by the first named means, at a predetermined point, and means under the control of the said wall for releasing the means for arresting the movement of the wall at a predetermined point to return to its normal position.

5. In a machine of the character described, a suitable casing, a member movable with relation to the casing and constituting one wall of a chamber within the casing, a gate for said conduit movable with relation to the said casing to open and close the conduit, and when open constituting one wall of the chamber within the casing, and means for actuating the said movable member to cause the discharge of the contents of the chamber.

6. In a machine of the character described, a suitable casing, a member movable with relation to the casing and constituting one wall of a chamber within the casing, a conduit opening into the casing, a gate for said conduit movable with relation to the casing to open and close the conduit, and when open constituting one wall of the chamber within the casing, means for actuating the movable member in a direction away from the gate to determine the capacity of the chamber, and means for returning the movable member toward the gate to cause the discharge of the contents of the chamber.

7. In a machine of the character described a suitable casing, a movable member constituting one wall of a chamber within the casing, a conduit opening into the casing, a gate for said conduit movable to open and close the conduit, and when open constituting one wall of the chamber within the casing, and a plurality of stop devices movable individually into the path of the movable member at different distances from the initial position of the latter to arrest the said movable member to determine the size of the chamber of which the said movable member forms one wall.

8. In a machine of the character described a suitable casing, a movable member constituting one wall of a chamber within the casing, a conduit opening into the casing, a gate for said conduit, movable to open and close the conduit, and when open constituting one wall of the chamber within the casing, means for actuating the movable member in the direction away from the gate, means for returning the movable member toward the gate, and a plurality of stop devices movable individually into the path of the movable member at different distances from the initial position of the latter to arrest the said movable member to determine the size of the chamber of which the said movable member forms one wall.

9. In a machine of the character described a casing, a movable wall therein constituting one wall of a variable chamber, means for normally maintaining the movable wall in a position to form a chamber of minimum size, means constraining the wall to move away from its initial position, and means operable from the exterior of the casing for releasing said maintaining means whereby the wall is free to move under the action of said constraining means.

10. In a machine of the character described a casing, a movable wall therein constituting one wall of a variable chamber, means for normally maintaining the movable wall in position to form a chamber of minimum size, means constraining the wall to move away from its initial position, means operable from the exterior of the casing for releasing said maintaining means whereby the wall is free to move under the action of said constraining means, and means for arresting the movement of the wall away from its initial position to determine the size of the variable chamber at will.

11. In a machine of the character described a casing, a pivoted plate or blade constituting one wall of a variable chamber, a weight for normally maintaining the movable plate in a position to form a chamber of minimum size, another weight constraining the plate to move away from its initial position, and means operable from the exterior of the casing for causing the movement of the first named weight away from the pivoted plate to release the latter whereby it is free to move under the action of the second named weight.

12. In the machine of the character described a casing, a pivotal plate or blade constituting one wall of a variable chamber, a weight for normally maintaining the movable plate in the position to form a chamber of minimum size, another weight constraining the plate to move away from its initial position, means operable from the exterior of the casing for causing the movement of the first named weight away from the pivoted plate to release the latter whereby it is free to move under the action of the second named weight, and means for arresting the movement of the plate away from its initial position, to determine the size of the variable chamber at will.

13. In a machine of the character described a casing, a pivoted plate or blade constituting one wall of a variable chamber, a weight for normally maintaining the movable plate in a position to form a chamber of minimum size, another weight constraining the plate to move away from its initial position, means operable from the exterior of the casing for causing the movement of the first named weight away from the pivoted plate to release the latter whereby it is free to move under the action of the second named weight, and stops movable individually into the path of the pivoted plate, the several stops being arranged progressively to permit different lengths of travel of said plate to vary the size of the chamber controlled by said plate.

14. In a machine of the character described a casing, a pivoted plate or blade constituting one wall of a variable chamber, a weight for normally maintaining the movable plate in a position to form a chamber of minimum size, another weight constraining the plate to move away from its initial position, means operable from the exterior of the casing for causing the movement of the first named weight away from the pivoted plate, to release the latter whereby it is free to move under the action of the second named weight, a conduit for the material to be delivered, leading into the casing, a gate for normally closing the conduit, and, when open, constituting one wall of the variable chamber opposite the pivoted plate, and connections between the gate and the means for operating the first named weight for causing movement of the gate simultaneous with the movement of the weight.

15. In a machine of the character described a casing, a pivoted plate or blade constituting one wall of a variable chamber, a weight for normally maintaining the movable plate in a position to form a chamber of minimum size, another weight constraining the plate to move away from its initial position, means operable from the exterior of the casing for causing the movement of the first named weight away from the pivoted plate, to release the latter whereby it is free to move under the action of the second named weight, a conduit for the material to be delivered, leading into the casing, and provided with an escape opening or passage, a gate normally closing the conduit and movable away from the same to unclose the opening, and when moved away constituting one wall of the variable chamber opposite the movable plate, and stops movable individually into the path of the pivoted plate, the several stops being arranged progressively to permit different lengths of travel of said plates to vary the size of the chamber controlled by said plate.

16. In a machine of the character described a casing, a pivoted plate or blade, constituting one wall of a variable chamber within the casing, a weight for normally maintaining the movable plate in a position to form a chamber of minimum size, another weight constraining the plate to move away from its initial position, means operable from the exterior of the casing for causing the movement of the first named weight away from the pivoted plate to release the latter whereby it is free to move under the action of the second named weight, a conduit for the material to be delivered leading into the casing, a gate for normally closing the conduit and movable to open the same, and when in the latter position constituting one wall of the variable chamber opposite the pivoted plate, connections between the gate and first named weight for causing the simultaneous operation of the gate and weight, a receptacle in operative relation to the variable chamber for receiving material discharged therefrom, and stops movable individually into the path of the pivoted plate, the several stops being arranged progressively to permit different lengths of travel of said plate to vary the size of the chamber controlled by said plate.

17. In a machine of the character described a casing inclosing a variable chamber, a movable member constituting an adjustable wall for said chamber, means for constraining the movable member to travel in a direction to enlarge the chamber, and a series of stops for said movable member, said stops being movable individually into the path of the movable member for arresting the movement of the latter.

18. In a machine of the character described a casing inclosing a variable chamber, a movable member constituting an adjustable wall for said chamber, means for constraining the movable member to travel in a direction to enlarge the chamber, and a series of stops for said movable member, said stops being movable individually into the path of the movable member for arresting the movement of the latter, and each stop comprising a push-key, a spring for returning said key to its initial position, and a lock for holding the push-key in its actuated position and under the control of the movable member.

19. In a machine of the character described a casing inclosing a variable chamber, a movable member constituting an adjustable wall for said chamber, means for constraining the movable member to travel in a direction to enlarge the chamber, a series of stops for said movable member, said stops being movable individually into the path of the movable member for arresting the movement of the latter, and means for the adjustment of said stops in the direction of travel of the said movable member.

20. In a machine of the character described a casing inclosing a variable chamber, a movable member constituting an adjustable wall for said chamber, means for constraining the movable member to travel in a direction to enlarge the chamber, and a series of stops for said movable member, said stops being movable individually into the path of the movable member for arresting the movement of the latter, and each stop comprising a push-key, a spring for returning said key to its initial position, locks for holding the push-key in its actuated position and under the control of the movable member, and means for the adjustment of said stops individually in the direction of travel of the said movable member.

In testimony that I claim the foregoing as my own, I have hereto affixed my signature in the presence of two witnesses.

WILLIAM WALLACE READ.

Witnesses:
F. D. PENNY,
N. H. DAVIS.